(12) United States Patent
Ueda et al.

(10) Patent No.: US 8,125,874 B2
(45) Date of Patent: Feb. 28, 2012

(54) OPTICAL PICKUP DEVICE

(75) Inventors: Yasuo Ueda, Osaka (JP); Yoshiyuki Hashimoto, Osaka (JP); Noriaki Terahara, Osaka (JP); Toshiaki Takasu, Osaka (JP); Toshiyasu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/020,557

(22) Filed: Feb. 3, 2011

(65) Prior Publication Data

US 2011/0194397 A1 Aug. 11, 2011

(30) Foreign Application Priority Data

Feb. 5, 2010 (JP) ................................. 2010-023881

(51) Int. Cl.
*G11B 7/00* (2006.01)
*G11B 7/135* (2006.01)
(52) U.S. Cl. ......... 369/112.17; 369/112.09; 369/112.14; 369/112.21; 369/112.29
(58) Field of Classification Search ............ 369/112.17, 369/112.09, 112.14, 112.21, 112.29
See application file for complete search history.

(56) References Cited

U.S. PATENT DOCUMENTS

| | | | | |
|---|---|---|---|---|
| 4,530,080 A * | 7/1985 | Aoi et al. | | 369/44.13 |
| 2006/0285473 A1* | 12/2006 | Kan | | 369/112.16 |
| 2009/0161521 A1* | 6/2009 | Kamada et al. | | 369/112.22 |
| 2009/0252018 A1* | 10/2009 | Tanabe et al. | | 369/112.15 |
| 2010/0246347 A1* | 9/2010 | Tanaka et al. | | 369/47.15 |

FOREIGN PATENT DOCUMENTS

JP 2009-199672 9/2009

* cited by examiner

*Primary Examiner* — Joseph Feild
*Assistant Examiner* — Aneeta Yodichkas
(74) *Attorney, Agent, or Firm* — Brinks Hofer Gilson & Lione

(57) ABSTRACT

An optical pickup device has a DVD/CD laser diode for emitting a DVD/CD laser beam as linear polarized light, and a BD laser diode for emitting a BD laser beam. The optical pickup device has a dichroic mirror that regularly reflects a part of the DVD/CD laser beam, transmits a part of the DVD/CD laser beam, and transmits return light of the BD laser beam. The dichroic mirror is formed so that a product of reflectance of outward light of the DVD/CD laser beam and transmittance of return light of the DVD/CD laser beam becomes 20% or more to 25% or less. A light receiving element receives the return light of the DVD/CD laser beam transmitted through the dichroic mirror or the return light of the BD laser beam transmitted through the dichroic mirror.

5 Claims, 3 Drawing Sheets

OPTICAL PICKUP DEVICE

This application claims priority to JP2010-023881 filed on Feb. 5, 2010, the content of which is incorporated herein by reference.

RELATED APPLICATIONS

This application claims priority under 35 U.S.C. §119 to Japanese Patent Application No. 2010-023881 filed on Feb. 5, 2010, the entire content of which is hereby incorporated by reference.

BACKGROUND OF THE INVENTION

In optical pickup devices that perform recording/reproducing on/from optical disks, conventionally, laser diodes that emit a CD (Compact Disk) infrared laser with central wavelength of 800 nm and a DVD (Digital Versatile Disk) red laser with central wavelength of 650 nm have been used. In recent years, optical pickup devices that perform high-density recording using a BD (Blu-ray Disk) laser with central wavelength of 405 nm are put to practical use. A market of optical disk devices having optical pickup devices for BD grows.

However, at a stage that BD, DVD and CD coexist, it is necessary that one optical disk device enables recording/reproducing on/from plural kinds of optical disks with different wavelengths.

A diameter of a spot focused on a recording surface of an optical disk is different between a DVD/CD laser and a BD laser. Since a refractive index of an optical member such as an objective lens varies with wavelengths, one optical system cannot be directly shared. Therefore, individual optical systems are set for respective wavelengths, thereby realizing the recording/reproducing on/from plural kinds of optical disks.

However, in a case of an optical disk device to be incorporated into an electronic device such as a laptop personal computer that requires further miniaturization, weight saving and thinning, a strenuous demand is made such that a recording/reproducing mechanism for BD should be added and housed in a space equivalent to a space for a conventional optical disk device for DVD/CD. However, it is difficult to provide an optical system for recording/reproducing on/from BD separately from a conventional mechanism into a narrow space.

Therefore, a suggestion that a part of the optical system is shared and thus a space is saved is made.

FIG. 3 is a schematic diagram illustrating a basic configuration of an optical system of a conventional optical pickup device. As shown in FIG. 3, in conventional optical pickup devices, at the time of recording/reproducing on/from CD or DVD, DVD/CD laser diode 401 emits a dual-wavelength laser for recording/reproducing on/from DVD or CD. Outward light of the dual-wavelength laser for DVD/CD is transmitted through optical member 402. The outward light is transmitted through beam splitter 405, 80% or more of the outward light is reflected by DVD/CD reflective plate 406, and is transmitted through optical part 407 so as to be sent to DVD/CD objective lens 408. Particularly in a case of recording, 20% or less of the outward light is transmitted through DVD/CD reflective plate 406, and an approximately entire quantity of the outward light is transmitted through BD laser reflective plate 410 so as to enter light receiving element 415 used for controlling a laser power.

Optical part 407 has an aperture filter, a polarization hologram, and a quarter wavelength plate. The aperture filter realizes a necessary number of apertures that is compatible with DVD and CD. The polarization hologram reacts to DVD light. The quarter wavelength plate generates a phase difference of a quarter wavelength for outward light. The outward light, that is polarized into circular polarized light by optical part 407 and is focused by DVD/CD objective lens 408, is emitted to optical disk 409. DVD/CD return light reflected from optical disk 409 follows the same route as that of the outward light, and is returned into linear polarized light by optical part 407. Since a polarization direction of the return light is perpendicular to that of the outward light, an approximately entire quantity of the return light is reflected from DVD/CD laser reflective plate 406, and is transmitted through beam splitter 405 similarly to the outward light. Since the polarization direction of the return light is perpendicular to that of the outward light, the return light is reflected by optical part 402 and is received by light receiving element 413.

On the other hand, in a case of recording/reproducing on/from BD, BD laser diode 403 emits a BD laser. Outward light of the BD laser passes through optical member 404. The outward light is reflected by a reflective surface of beam splitter 405. The outward light is transmitted through reflective plate 406 for DVD/CD, 80% or more of the outward light is reflected by BD laser reflective plate 410 and is transmitted through optical part 411 so as to be sent to BD objective lens 412. Particularly in a case of recording, 20% or less of the outward light is transmitted through BD laser reflective plate 410, and enters light receiving element 415 used for controlling a laser power.

Optical part 411 has a quarter wavelength plate for generating a phase difference of a quarter wavelength in BD light. The outward light, that is polarized into circular polarized light by optical part 411 and is focused by BD objective lens 412, is emitted to optical disk 409. BD return light, that is reflected from optical disk 409, follows the same route as that of the outward light, and is returned to linear polarized light by optical part 411. Since a polarization direction of the return light is perpendicular to that of the outward light, an approximately entire quantity of the return light is reflected from the BD laser reflective plate 410, and is transmitted through DVD/CD reflective plate 406 similarly to the outward light so as to be reflected from the reflective surface of beam splitter 405. Since the polarization direction of the return light is perpendicular to that of the outward light, the return light is reflected by optical member 404 and is received by light receiving element 413.

Such a configuration enables the recording/reproducing on/from optical disks compatible to DVD, CD and BD.

SUMMARY OF THE INVENTION

A technique disclosed here relates to an optical pickup device in which light is emitted as outward light to an optical disk and reflected light from the optical disk is received as return light by a light receiving element. The optical pickup device has a first light source for emitting first light as linear polarized light, a second light source for emitting second light as linear polarized light with wavelength shorter than that of the first light. The optical pickup device has a first objective lens for focusing the first light and emitting the first light to the optical disk, a second objective lens for focusing the second light and emitting the second light to the optical disk, and a dichroic mirror, that is provided between the first light source and the first objective lens, for regularly reflecting a part of the first light, transmitting a part of the first light and transmitting return light of the second light. The dichroic mirror is formed so that a product of reflectance of the outward light of the first light and transmittance of return light of the first light becomes 20% or more to 25% or less regardless of a polarization direction of light incident on dichroic mirror 8. The light receiving element receives the return light of the first light transmitted through the dichroic mirror or the return light of the second light transmitted through the dichroic mirror.

DETAILED DESCRIPTION OF THE PREFERRED EMBODIMENT

Embodiment

1. Outline of Optical Pickup Device 100

Figure 1:
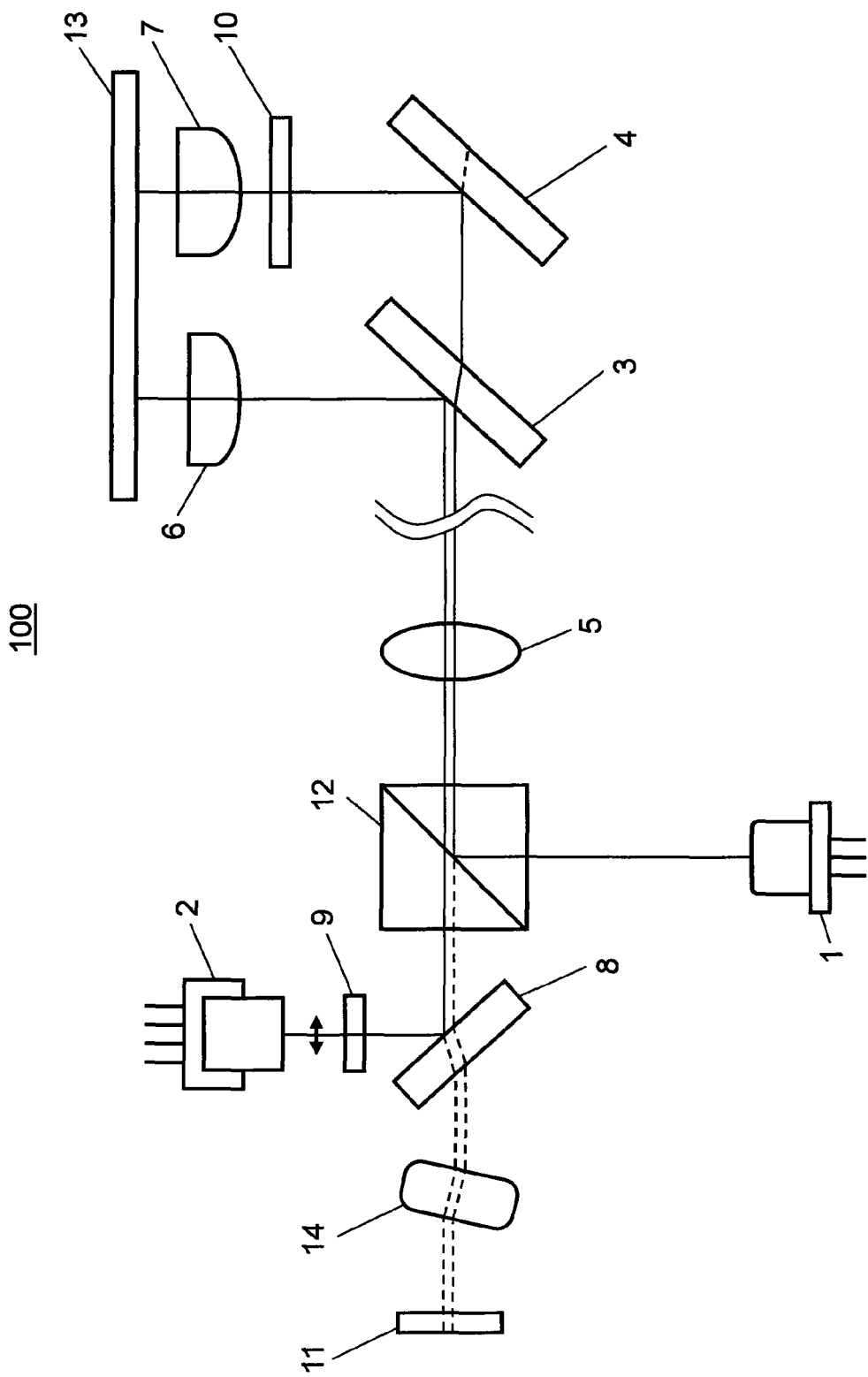
FIG. 1 shows a schematic diagram showing an optical pickup device according to an embodiment.

As shown in FIG. 1, optical pickup device 100 according to an embodiment has a three-wavelength laser diode for reproducing from optical disks including BD, DVD and CD. Optical pickup device 100 has an optical path having dichroic mirror 8 for reflecting and transmitting about ¼ to ½ quantity of a DVD/CD laser beam as first light according to a polarization direction and transmitting an approximately entire BD laser beam as second light.

2. Constitution of Optical Pickup Device 100

In the following description, a direction parallel with a disk surface of optical disk 13 in FIG. 1 is referred to as a horizontal direction, and a direction vertical to the disk surface is referred to as a vertical direction. As shown in FIG. 1, optical pickup device 100 has DVD/CD laser diode 2 having a DVD/CD laser as a first light source in positions separated from each other by about 100 μm to 120 μm in the horizontal direction and BD laser diode 1 as a second light source for emitting light.

Optical pickup device 100 has DVD/CD objective lens 6 as a first objective lens and BD objective lens 7 as a second objective lens.

Optical pickup device 100 further has an optical path having dichroic mirror 8 for reflecting and transmitting about ¼ to ½ quantity of the DVD/CD laser beam according to the polarization direction and transmitting an approximately entire quantity of the BD laser beam. Optical pickup device 100 further has DVD wavelength plate 9 for shifting a phase in the vertical direction with respect to the horizontal direction of the DVD/CD laser beam by ¼ of a DVD wavelength, and BD wavelength plate 10 for shifting a phase in the vertical direction with respect to the horizontal direction of the BD laser beam by ¼ of a BD wavelength. Further, optical pickup device 100 has light receiving element 11 for converting signal information from optical disk 13 into an electric signal so as to output the signal.

3. Constitution of Dichroic Mirror 8

The embodiment is characterized by a configuration of dichroic mirror 8. As shown in FIG. 1, dichroic mirror 8 is formed with a dichroic film on a substrate made of a quartz glass plate. The dichroic film has a characteristic such that about ¼ to ½ quantity of a DVD/CD laser beam is reflected from and transmitted through a surface opposed to DVD/CD laser diode 2 according to the polarization direction, and an approximately entire quantity of a BD laser beam is transmitted therethrough.

The dichroic film is formed by evaporating plural layers of dielectric thin films on the substrate. Concretely, as the dielectric film, a member with high refractive index such as $TiO_2$ (titanium dioxide), a member with low refractive index such as $SiO_2$ (silicon dioxide), and a member with intermediate refractive index are combined to be laminated.

The more a number of films to be laminated increases, the more precipitous a transmittance/reflection spectroscopic property can be with respect to a wavelength. When light is reflected from a substance such as quartz glass with higher refractive index than that of air, the light is easily reflected in a polarization direction vertical to a reflection axis, but is difficulty reflected in a polarization direction horizontal with the reflection axis. When twenty to thirty dielectric thin films are laminated on such quartz glass, a dichroic film, that transmits an approximately entire BD laser beam and reflects and transmits about ¼ to ½ quantity of a DVD/CD laser beam according to the polarization direction, is formed.

4. Operation of Optical Pickup Device

As shown in FIG. 1, DVD/CD laser diode 2 emits a DVD outward light with central wavelength of 650 nm. Since DVD and CD light emitting points should be arranged in the horizontal direction, the DVD outward light is linear polarized light in the horizontal direction. The DVD outward light is converted into circular polarized light by DVD wavelength plate 9. About half of the DVD outward light converted into the circular polarized light is regularly reflected by dichroic mirror 8. An approximately entire quantity of the DVD outward light is transmitted through beam splitter 12. Further, the DVD outward light is converted into parallel light by collimating lens 5. The DVD outward light as the parallel light of the circular polarized light is reflected by DVD/CD laser reflective plate 3. The DVD outward light is focused on a signal surface of optical disk 13 by the DVD objective lens.

On the other hand, BD laser diode 1 emits BD outward light with central wavelength of 405 nm. BD laser diode 1 is arranged so that the BD outward light becomes linear polarized light in the vertical direction. An entire quantity of the BD outward light is reflected by beam splitter 12. The reflected BD outward light is converted into parallel light by collimating lens 5. The BD outward light of the parallel light is transmitted through DVD/CD laser reflective plate 3. The BD outward light of the parallel light is reflected by BD laser reflective plate 4. The BD outward light is transmitted through BD wavelength plate 10 so as to be converted into circular polarized light. BD outward light as parallel light of the circular polarized light is focused on a signal surface of optical disk 13 by BD objective lens 7.

DVD return light that is reflected by optical disk 13 is converted into parallel light by DVD/CD objective lens 6. The DVD return light is again reflected by DVD/CD laser reflective plate 3. The DVD return light is converted into convergent light by collimating lens 5. The DVD return light is transmitted through beam splitter 12. About half of the DVD return light is regularly reflected by dichroic mirror 8. In other words, about half of the DVD return light is transmitted through dichroic mirror 8. Further, a beam shape of the DVD return light transmitted through dichroic mirror 8 is deformed so that a servo signal is generated by detection lens 14.

Finally, light receiving element 11 detects signal information and a servo signal of optical disk 13.

About half of the DVD return light that is regularly reflected by dichroic mirror 8 passes through DVD wavelength plate 9, so that circular polarized light becomes linear polarized light in the vertical direction. The DVD return light of the linear polarized light returns to DVD/CD laser diode 2. For this reason, since the DVD return light interferes with the DVD/CD laser beam emitted from DVD/CD laser diode 2, there is fear that a noise is generated in the DVD/CD laser beam. In the embodiment, however, the DVD return light is the linear polarized light in the vertical direction perpendicular to the linear polarized light in the horizontal direction as the DVD outward light. Therefore, the generation of noises due to the interference between the DVD return light and the DVD outward light can be reduced.

On the other hand, BD return light is converted into parallel light by BD objective lens 7. The BD return light is transmitted through BD wavelength plate 10. Therefore, the BD return light of circular polarized light becomes linear polarized light in the horizontal direction whose polarization direction is different from that of the outward light by 90°. The BD return light is reflected by BD laser reflective plate 4. The BD return light is transmitted through DVD/CD laser reflective plate 3. The BD return light is converted into convergent light by collimating lens 5. A polarization direction of the convergent light of the BD return light is perpendicular to the polarization direction of the BD outward light. As described above, beam splitter 12 reflects the approximately entire BD outward light as the polarized light in the vertical direction. On the other hand, beam splitter 12 transmits the approximately entire BD return light as the polarized light in the horizontal direction. That is, an approximately entire quantity of the BD return light reaches dichroic mirror 8.

The BD return light is transmitted through dichroic mirror 8. Similarly to the DVD return light, a beam shape of the BD return light is deformed so that detection lens 14 generates a servo signal. Finally, light receiving element 11 detects signal information and a servo signal of optical disk 13.

Since dichroic mirror 8 transmits the approximately entire BD return light, the BD return light is not practically emitted to DVD wavelength plate 9. Therefore, the BD return light does not practically return to DVD/CD laser diode 2. Conventionally, crystal has been used as a material of DVD wavelength plate 9. In recent years, a resin member is frequently used as a material of DVD wavelength plate 9. However, when light in wavelength band of a BD laser beam is emitted to the resin member for a long time, the resin member is deteriorated. In the embodiment, since the BD return light is not practically emitted to DVD wavelength plate 9, the resin member can be used for DVD wavelength plate 9.

5. Function of Dichroic Mirror 8

Dichroic mirror 8 regularly reflects a part of DVD outward light, and transmits a part of the DVD outward light. Dichroic mirror 8 regularly reflects a part of DVD return light, and transmits a part of DVD return light. Dichroic mirror 8 transmits approximately entire BD return light.

Concretely, dichroic mirror 8 has reflectance of 28% or more to 50% or less with respect to the linear polarized light with DVD wavelength in the horizontal direction. The dichroic mirror 8 has transmittance of 50% or more to 72% or less with respect to the linear polarized light with DVD wavelength in the horizontal direction. A sum of the reflectance and the transmittance is 100% or less.

Dichroic mirror 8 has reflectance of 50% or more to 72% or less with respect to linear polarized light with DVD wavelength in the vertical direction. Dichroic mirror 8 has transmittance of 28% or more to 50% or less with respect to the linear polarized light with DVD wavelength in the vertical direction. A sum of the reflectance and the transmittance is 100% or less.

At this time, efficiency of dichroic mirror 8 is 20% or more to 25% or less. The efficiency of dichroic mirror 8 is calculated by a product of the reflectance of the DVD outward light and the transmittance of the DVD return light.

Dichroic mirror 8 has a function for reflecting the DVD outward light and transmitting the DVD return light. In order to make the efficiency of dichroic mirror 8 maximum, an upper limit value of the reflectance of the DVD outward light is determined as 50%. That is, the upper limit value of the efficiency of dichroic mirror 8 is determined as 25%.

For example, DVD-RAM and DVD-RW in various media according to DVD standards are low-reflectance optical disks. As to the low-reflectance optical disks, reproducing performance jitter is greatly influenced by a signal level detected in light receiving element 11. That is, when a signal level greatly drops, the jitter is deteriorated.

Figure 2:
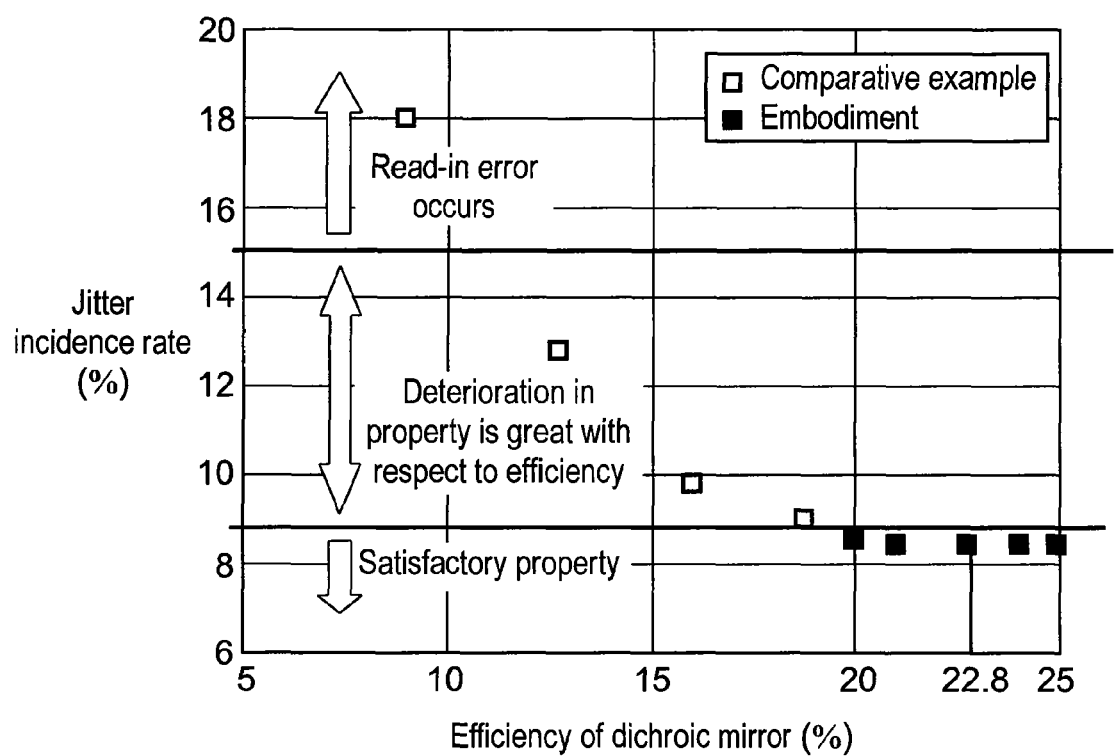
FIG. 2 shows a relationship diagram between efficiency and jitter of a dichroic mirror.
Figure 3:
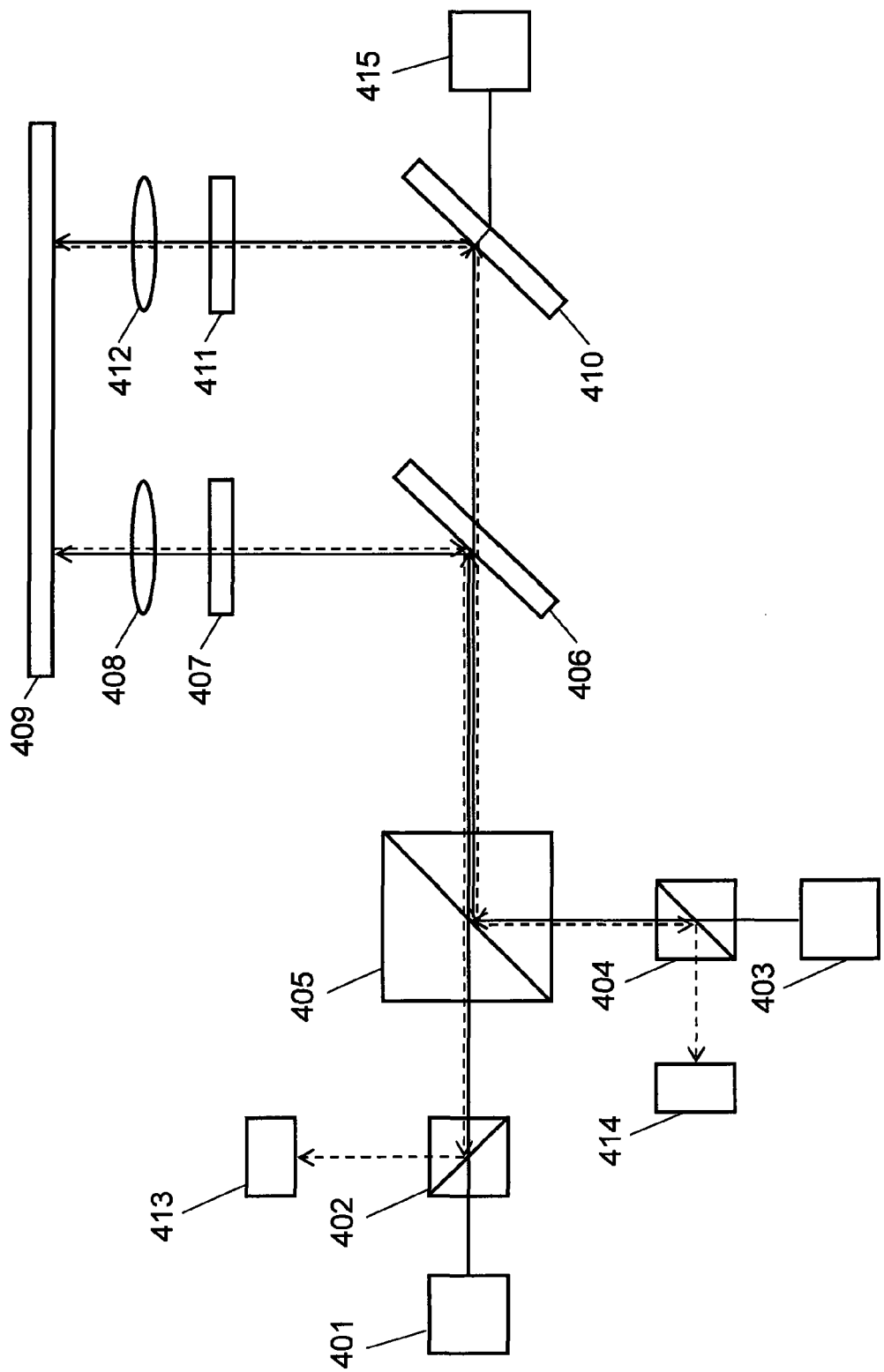
FIG. 3 shows a schematic diagram showing a conventional optical pickup device.

The inventors, therefore, have inspected a relationship between dichroic mirror 8 having various efficiencies and an incidence rate of the jitter using the low-reflectance optical disk. As a result, as shown in FIG. 2, when the efficiency of dichroic mirror 8 is less than 20%, the incidence rate of the jitter abruptly increases. Therefore, it is preferable that the efficiency of dichroic mirror 8 is 20% or more.

As shown in FIG. 2, it is more preferable that the efficiency of dichroic mirror 8 is 22.8% or more to 25% or less with which the incidence rate of the jitter reduces. In this case, the dichroic mirror 8 has the reflectance of 35% or more to 50% or less with respect to the linear polarized light with DVD wavelength in the horizontal direction. Dichroic mirror 8 has the transmittance of 50% or more to 65% or less with respect to the linear polarized light with DVD wavelength in the horizontal direction. A sum of the reflectance and the transmittance is 100% or less.

Dichroic mirror 8 has the reflectance of 50% or more to 65% or less with respect to the linear polarized light with DVD wavelength in the vertical direction. Dichroic mirror 8 has the transmittance of 35% or more to 50% or less with respect to the linear polarized light with DVD wavelength in the vertical direction. A sum of the reflectance and the transmittance is 100% or less.

When optical disk 13 has birefringence, the polarization direction of the DVD return light changes. The polarization direction changes from the polarization direction in the vertical direction as return polarization direction of the return light by birefringence. Therefore, the reflectance in optical part 402 drops, and a light receiving signal level drops. When the birefringence is very high and the return polarization direction in the vertical direction is changed into the polarization direction in the horizontal direction, optical part 402 reflects the approximately entire light, and thus the signal does not return to light receiving element 414. In the embodiment, however, optical disk 13 having very high birefringence is used, and even if the DVD return light is converted into linear polarized light in the vertical direction, a drop in the efficiency of dichroic mirror 8 is repressed within an allowable range. This is because dichroic mirror 8 has the transmittance of at least 35% with respect to the linear polarized light in the vertical direction.

On the other hand, when optical disk 13 is for BD, optical disk 13 has birefringence that is lower than that of DVD/CD.

This is because a thickness (0.1 mm) from a surface through a recording layer of BD is smaller than a thickness (0.6 mm to 1.2 mm) from a surface through a recording layer of DVD/CD. Therefore, dichroic mirror 8 transmits an approximately entire quantity of the BD return light.

In optical pickup device 100, DVD wavelength plate 9 may be omitted. Also in this case, since dichroic mirror 8 has the characteristic such that a change in the transmittance according to the polarization direction is repressed, an influence upon the reproducing performance jitter is small. Therefore, light receiving detection accuracy can be maintained.

6. Conclusion

Optical pickup device 100 according to the embodiment has DVD/CD laser diode 2 for emitting a DVD/CD laser beam as the linear polarized light, and BD laser diode 1 for emitting a BD laser beam. The optical pickup device 100 has DVD/CD objective lens 6 that focuses and emits a DVD/CD laser beam on/to optical disk 13, and BD objective lens 7 that focuses and emits a BD laser beam on/to optical disk 13. Optical pickup device 100 has dichroic mirror 8 that is provided between DVD/CD laser diode 2 and DVD/CD objective lens 6, regularly reflects a part of the DVD/CD laser beam, transmits a part of the DVD/CD laser beam and transmits return light of the BD laser beam. Dichroic mirror 8 is formed so that the product of the reflectance of the outward light of the DVD/CD laser beam and the transmittance of the return light of the DVD/CD laser beam is 20% or more to 25% or less. Further, light receiving element 11 receives the return light of the DVD/CD laser beam transmitted through dichroic mirror 8 or the return light of the BD laser beam transmitted through dichroic mirror 8.

With such a configuration, even when the return light in the same polarization direction as that of the outward light of the DVD/CD laser enters dichroic mirror 8, light receiving element 11 can detect the return light as a signal. Therefore, a quarter wavelength plate for inverting a phase difference (polarization direction) between the outward light and the return light of the DVD/CD laser beam to optical disk 13 does not have to be mounted to the vicinity of DVD/CD objective lens 6. That is, DVD wavelength plate 9 as the quarter wavelength plate is mounted between DVD/CD laser diode 2 and dichroic mirror 8.

As another embodiment, an optical pickup device may be configured so that DVD wavelength plate 9 may be omitted from the embodiment.

With such a configuration, the DVD/CD laser beam in the form of the linear polarized light is emitted as the outward light to optical disk 13.

According to the present invention, in the optical pickup device using light with a plurality of wavelengths for BD and CD, thinning and miniaturization can be realized with the light receiving detection accuracy being maintained. Therefore, the present invention can be widely useful for optical disk devices to be used in laptop personal computers.

What is claimed is:

1. An optical pickup device in which light is emitted as an outward light to an optical disk and the light reflected from the optical disk is received as a return light by a light receiving element, the device comprising:
    a first light source configured to emit a linearly polarized first light;
    a second light source configured to emit a linearly polarized second light with a wavelength shorter than that of the first light;
    a first objective lens configured to focus the first light onto the optical disk;
    a second objective lens configured to focus the second light onto the optical disk; and
    a dichroic mirror configured to partially reflect the first light therefrom and partially transmit the same therethrough, and substantially entirely transmit therethrough the return light of the second light, the dichroic mirror being provided between the first light source and the first objective lens, wherein the dichroic mirror is formed such that a product of its reflectance of the outward light of the first light and its transmittance of the return light of the first light is 20% or more to 25% or less, and
    the light receiving element receives the return light of the first light and the return light of the second light transmitted through the dichroic mirror.

2. The optical pickup device according to claim 1, wherein the dichroic mirror is formed such that the reflectance of a polarization wave in a horizontal direction in the first light is 35% or more to 50% or less, the transmittance of the polarization wave in the horizontal direction in the first light is 50% or more to 65% or less, and the reflectance of the polarization wave in a vertical direction in the first light is 50% or more to 65% or less, and the transmittance of the polarization wave in the vertical direction in the first light is 35% or more to 50% or less.

3. The optical pickup device according to claim 1, further comprising a wavelength plate positioned between the first light source and the dichroic mirror to shift a phase of the first light by a quarter wavelength.

4. The optical pickup device according to claim 2, further comprising a wavelength plate positioned between the first light and the dichroic mirror to shift a phase of the first light by a quarter wavelength.

5. The optical pickup device according to claim 1, wherein the dichroic mirror is positioned to receive both the outward and return light of the first light but only receive the return light of the second light.

\* \* \* \* \*